(12) United States Patent
Huang et al.

(10) Patent No.: US 12,115,733 B2
(45) Date of Patent: Oct. 15, 2024

(54) UNFUSED THERMAL SUPPORT AREA IN 3D FABRICATION SYSTEMS

(71) Applicant: Hewlett-Packard Development Company, L.P., Spring, TX (US)

(72) Inventors: Wei Huang, Palo Alto, CA (US); Gary J. Dispoto, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/139,460

(22) Filed: Apr. 26, 2023

(65) Prior Publication Data

US 2023/0356474 A1 Nov. 9, 2023

Related U.S. Application Data

(62) Division of application No. 16/607,379, filed as application No. PCT/US2017/058361 on Oct. 25, 2017, now Pat. No. 11,660,823.

(51) Int. Cl.
*B29C 64/40* (2017.01)
*B29C 64/165* (2017.01)
(Continued)

(52) U.S. Cl.
CPC ............ *B29C 64/40* (2017.08); *B29C 64/165* (2017.08); *B29C 64/393* (2017.08); *B33Y 10/00* (2014.12); *B33Y 30/00* (2014.12); *B33Y 50/02* (2014.12)

(58) Field of Classification Search
CPC ........ B22F 10/40; B22F 10/368; B22F 10/85; B22F 12/90; B22F 10/14; B29C 64/40;
(Continued)

(56) References Cited

U.S. PATENT DOCUMENTS 9,144,940 B2 9/2015 Martin
9,527,247 B2 12/2016 Dikovsky et al.
(Continued)

FOREIGN PATENT DOCUMENTS

CN 1950192 A 4/2007
CN 105127424 A 12/2015
(Continued)

OTHER PUBLICATIONS

"3D Printer Filament Types Overview", 2014, retrieved from: http://3dprintingfromscratch.com/common/3d-printer-filament-types-overview/; retrieved on: Oct. 23, 2019, pp. 17.
(Continued)

*Primary Examiner* — Yunju Kim
(74) *Attorney, Agent, or Firm* — Shook, Hardy & Bacon L.L.P.

(57) ABSTRACT

According to examples, a three-dimensional (3D) fabrication system may include a controller that may control an agent delivery system to deposit a fusing agent onto a fusing area of a layer of particles of build material. The controller may also control the agent delivery system to deposit an energy absorbing agent onto an unfused thermal support area of the layer of particles, the unfused thermal support area being located adjacent to the fusing area. The controller may further control an energy supply system to supply energy, in which supply of the energy is to cause the particles on which the fusing agent has been deposited to melt and a temperature of the particles in the unfused thermal support area to be raised to a level that is below a melting point temperature of the particles.

12 Claims, 5 Drawing Sheets

(51) Int. Cl.
*B29C 64/393* (2017.01)
*B33Y 10/00* (2015.01)
*B33Y 30/00* (2015.01)
*B33Y 50/02* (2015.01)

(58) Field of Classification Search
CPC ... B29C 64/393; B29C 64/141; B29C 64/165; B29C 64/268
See application file for complete search history.

(56) References Cited

U.S. PATENT DOCUMENTS

| | | |
|---|---|---|
| 9,534,103 B2 | 1/2017 | Xu et al. |
| 2015/0273582 A1 | 10/2015 | Crump et al. |
| 2017/0136539 A1 | 5/2017 | Chou et al. |
| 2019/0054691 A1 | 2/2019 | Abbott et al. |

FOREIGN PATENT DOCUMENTS

| | | |
|---|---|---|
| CN | 107206677 A | 9/2017 |
| WO | 2015/108544 A1 | 7/2015 |
| WO | 2015/108546 A2 | 7/2015 |
| WO | 2015/136277 A1 | 9/2015 |
| WO | 2015/167530 A2 | 11/2015 |
| WO | 2016/068899 A1 | 5/2016 |
| WO | 2016/072966 A1 | 5/2016 |
| WO | 2016/099445 A1 | 6/2016 |
| WO | 2016/140670 | 9/2016 |
| WO | 2017/112689 A1 | 6/2017 |
| WO | 2017/131757 A1 | 8/2017 |
| WO | 2017/174112 A1 | 10/2017 |

OTHER PUBLICATIONS

"Designing for Printing Part 2: Why 3d Printed Parts Warp and How to Stop It", MarkForged, retrieved from: https://markforged.com/blog/3d-printed-part-warping/; retrieved on Oct. 23, 2019, pp. 16.

UNFUSED THERMAL SUPPORT AREA IN 3D FABRICATION SYSTEMS

CROSS-REFERENCE TO RELATED APPLICATIONS

This application is a divisional of U.S. patent application Ser. No. 16/607,379, filed on Oct. 23, 2019, which claims priority to PCT/US2017/058361, filed on Oct. 25, 2017. U.S. patent application Ser. No. 16/607,379 and PCT/US2017/058361 are incorporated in their entirety herein.

BACKGROUND OF THE INVENTION

In three-dimensional (3D) printing, an additive printing process is often used to make three-dimensional solid parts from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat and/or a chemical binder.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are 3D fabrication systems, apparatuses, and methods that may be implemented to deposit a fusing agent onto a fusing area of a layer of particles of build material and to deposit an energy absorbing agent to form an unfused thermal support area adjacent to the fusing area. In addition, the 3D fabrication systems and apparatuses disclosed herein may be implemented to supply energy onto the particles, such that the fusing agent deposited on the particles absorbs the energy and causes the temperature of those particles to rise to a level above a melting point temperature of the particles. The particles in the fusing area may thus melt and subsequently fuse together as the melted particles cool and solidify. In addition, the particles on which the fusing agent has not been deposited may not absorb sufficient energy to reach the melting point temperature.

However, the energy absorbing agent may be deposited in the unfused thermal support area at a sufficiently low contone level to cause the temperature of the particles in the unfused thermal support area to increase without reaching the melting point temperature. The energy absorbing agent may, in other examples, be deposited at a relatively higher contone level, but with a cooling agent or a defusing agent to keep the temperature of the particles in the unfused thermal support area below the melting point temperature. In one regard, through application of energy onto the energy absorbing agent, the temperature of the particles in the unfused thermal support area may rise without reaching a level that causes those particles to melt and subsequently fuse together. In another regard, because the particles in the unfused thermal support area may not fuse together, those particles may also not fuse with the particles in the fusing area. The particles in the unfused thermal support area may thus increase a temperature around the unfused thermal support area, including the fusing area.

As the particles in the fusing area may be at a higher temperature than the particles outside of the fusing agent, thermal bleed may occur from the particles in the fusing area to the particles outside of the fusing area. That is, heat from the particles in the fusing area may be transferred to the particles in the areas surrounding the fusing area. When the fusing area is at or above a certain size, the particles in the fusing area may be heated and may remain heated at a sufficiently high temperature such that the thermal bleed that occurs may be insufficient to prevent the particles from melting and fusing together as intended, e.g., to have an intended strength, rigidity, hardness, color, translucency, surface roughness, combinations thereof, or the like. However, when the size of the fusing area is below the certain size, the rate at which thermal bleed occurs may result in the particles in the fusing area from failing to reach and/or remain at or above the melting point temperature for sufficient melting to occur such that the particles fuse together as intended. The certain size may pertain to a thickness, a width, a length, an area, a volume, or combinations thereof, of the fusing area, which may extend across multiple layers of particles.

According to examples, by forming the unfused thermal support area adjacent to the fusing area, the rate of thermal bleed from the particles in the fusing area may be reduced. In this regard, the unfused thermal support area may facilitate the melting and fusing together of the particles in the fusing area. In other words, because the particles in the unfused thermal support area are at a higher temperature than the particles outside of the unfused thermal support area and the fusing area, a thermal gradient between the particles in the fusing area and the particles in the unfused thermal support area may be smaller than a thermal gradient between the particles in the fusing area and the particles outside of the unfused thermal support area. As such, the rate at which heat is transferred from the particles in the fusing area to the particles in the unfused thermal support area may be lower than the rate at which heat is transferred from the particles in the fusing area to the particles outside of the unfused thermal support area.

As discussed herein, the unfused thermal support area may include unfused particles and thus, the unfused thermal support area may facilitate the melting and fusing of the particles in the fusing area, particularly, when the fusing area is relatively small. According to examples, the energy absorbing agent may be a degradable fluid that may degrade within a certain period of time following receipt of the energy or in the presence of another agent. In these examples, the particles upon which the energy absorbing agent has been deposited may be recycled.

Through implementation of the 3D fabrication systems, apparatuses, and methods disclosed herein, 3D objects and/or sections of 3D objects having relatively small sizes, e.g., fine features, may be fabricated to have substantially increased mechanical strength, more accurate colors, improved surface quality, more accurate translucency, or the like. In addition, these results may be achieved without fusing particles outside of the particles that form the 3D objects, which may reduce overall costs associated with fabricating objects with build material particles as those particles may be reused.

Before continuing, it is noted that as used herein, the terms "includes" and "including" mean, but is not limited to, "includes" or "including" and "includes at least" or "including at least." The term "based on" means "based on" and "based at least in part on."

Figure 1A:
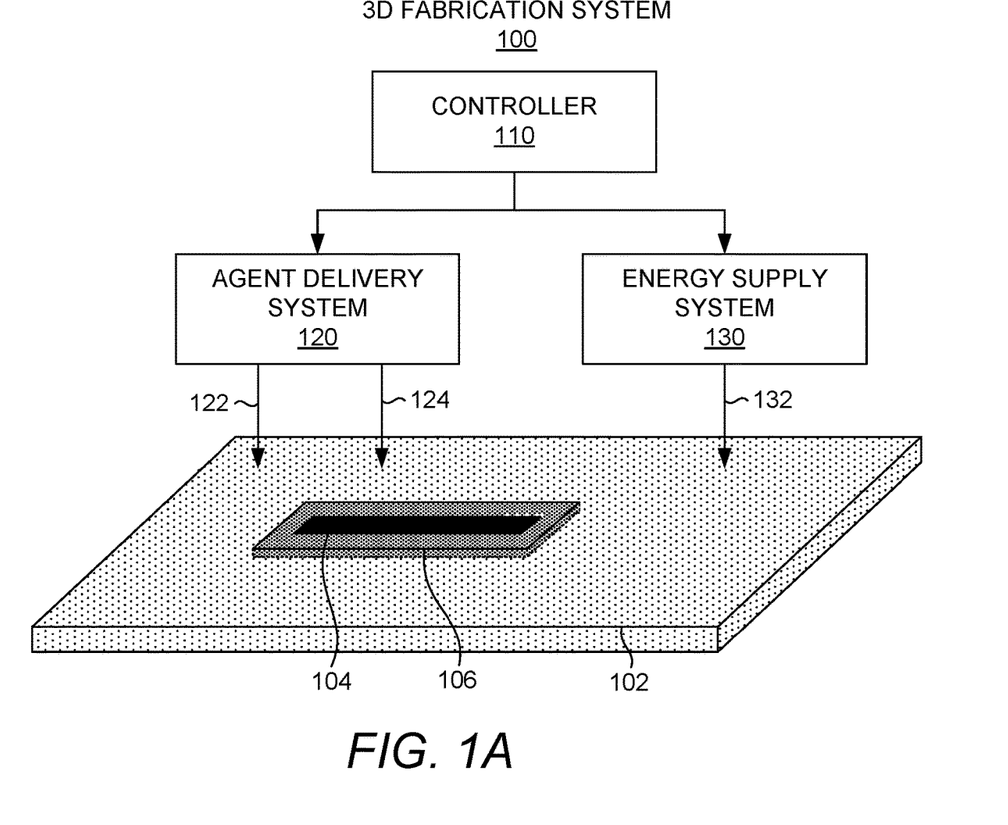
FIG. 1A shows a diagram of an example 3D fabrication system that may form an example unfused thermal support area to reduce a rate at which particles forming a portion of a 3D object thermally bleeds.

With reference first to FIG. 1A, there is shown a diagram of an example 3D fabrication system 100 that may form an unfused thermal support area to reduce a rate at which particles forming a portion of a 3D object thermally bleeds. It should be understood that the 3D fabrication system 100 depicted in FIG. 1A may include additional components and that some of the components described herein may be removed and/or modified without departing from a scope of the 3D fabrication system 100 disclosed herein.

The 3D fabrication system 100 may also be termed a 3D printer, a 3D fabricator, or the like. Generally speaking, the 3D fabrication system 100 may be implemented to fabricate 3D objects from particles 102 of build material, which may also be termed build material particles 102. The particles 102 of build material may include any suitable material including, but not limited to, a polymer, a plastic, a ceramic, a nylon, a metal, combinations thereof, or the like, and may be in the form of a powder or a powder-like material. Additionally, the particles 102 may be formed to have dimensions, e.g., widths, diameters, or the like, that are generally between about 5 μm and about 100 μm. In other examples, the particles 102 may have dimensions that are generally between about 30 μm and about 60 μm. The particles 102 may have any of multiple shapes, for instance, as a result of larger particles being ground into smaller particles. In some examples, the powder may be formed from, or may include, short fibers that may, for example, have been cut into short lengths from long strands or threads of material. The particles 102 have been shown as being partially transparent to enable a fusing area 104 and a thermal support area 106 to be visible. It should thus be understood that the particles 102 may not be transparent, but instead, may be opaque.

As shown in FIG. 1A, the 3D fabrication system 100 may include a controller 110, an agent delivery system 120, and an energy supply system 130. The controller 110 may control the agent delivery system 120 to deposit a fusing agent, which is represented by the arrow 122, onto a fusing area 104 of a layer of particles 102. The controller 110 may also control the agent delivery system 120 to deposit an energy absorbing agent, which is represented by the arrow 124, onto an unfused thermal support area 106. The unfused thermal support area 106 may be formed adjacent to the fusing area 104 and may not form part of a 3D object to be fabricated. The controller 110 may further control the energy supply system 130 to supply energy, which is represented by the arrow 132, onto the layer of particles 102, the fusing area 104, and the unfused thermal support area 106.

The fusing agent 122 may be a liquid, such as an ink, a pigment, a dye, or the like, that may enhance absorption of energy 132 emitted from the energy supply system 130. The agent delivery system 120 may deliver the fusing agent 122 in the form of droplets onto the layer of particles 102 such that the droplets of fusing agent 122 may be dispersed on the particles 102 and within interstitial spaces between the particles 102 in the fusing area 104. In the fusing area 104, the droplets of fusing agent 122 may be supplied at a sufficient density, e.g., contone level, to enhance absorption of sufficient energy 132 to cause the temperature of the particles 102 on which the fusing agent 122 has been deposited to increase to a level that is above a melting point temperature of the particles 102. In addition, the energy supply system 130 may supply energy 132 at a level that is insufficient to cause the particles 102 upon which the fusing agent 122 has not been supplied to remain below the melting point temperature of the particles 102.

The energy absorbing agent 124 may also be a liquid, such as an ink, a pigment, a dye, or the like, that may enhance absorption of energy 132 emitted from the energy supply system 130. The agent delivery system 120 may deliver the energy absorbing agent 124 in the form of droplets onto the layer of particles 102 such that the droplets of energy absorbing agent 124 may be dispersed on the particles 102 and within interstitial spaces between the particles 102 in the unfused thermal support area 106. In the unfused thermal support area 106, the droplets of energy absorbing agent 124 may be supplied at a sufficiently low density, e.g., contone level, to absorb sufficient energy 132 to cause the temperature of the particles 102 on which the energy absorbing agent 124 has been deposited to increase, but to a level that is below the melting point temperature of the particles 102. In other words, the droplets of energy absorbing agent 124 may be supplied at a sufficiently low density to increase the temperature of the particles 102 in the unfused thermal support area 106 without causing those particles 102 to fuse together. In addition or in other examples, a cooling agent and/or a defusing agent may be combined with the energy absorbing agent 124, such that the combination of agents may increase the temperature of the particles 102 upon which the combination has been deposited without causing those particles 102 to fuse together.

According to examples, the energy absorbing agent 124 may be a same agent as the fusing agent 122. In other examples, the energy absorbing agent 124 may be a different agent than the fusing agent 122. By way of particular example, the energy absorbing agent 124 may be a degradable agent that is to degrade within a predetermined time period following receipt of the supplied energy 132 or when placed into the presence of another agent. For instance, the degradable agent may be a liquid that is to degrade, e.g., evaporate, disintegrate, or the like, for instance, after a few minutes, a few hours, etc., after receiving the energy 132. In some examples, the degradable agent may be degradable through receipt of a chemical agent, for instance, that degrades the degradable agent without degrading or harming the particles 102. The degradable agent may degrade during fabrication of an object or following fabrication of the object. In any of these examples, the particles 102 upon which the energy absorbing agent 124 has been deposited may be reused, e.g., recycled, following degradation of the energy absorbing agent 124. In any of these examples, the density level, e.g., the contone level, at which the droplets of the energy absorbing agent 124 are deposited onto the unfused thermal support area 106 may substantially be lower than the density level at which the droplets of the fusing agent 122 are deposited onto the fusing area 104. In addition or in other examples, the energy absorbing agent 124 may be mixed with a cooling agent and/or a defusing agent.

As the particles 102 in the fusing area 104 may be at a higher temperature than the particles 102 on which the fusing agent 122 has not be been deposited, thermal bleed may occur from the particles 102 in the fusing area 104 to the particles 102 outside of the fusing area 104. That is, heat from the particles 102 in the fusing area 104 may be transferred to the particles 102 in the areas surrounding the fusing area 104. When the fusing area 104 is at or above a certain size, the particles 102 in the fusing area 104 may be heated and may remain heated at a sufficiently high temperature such that the thermal bleed that occurs may be insufficient to prevent the particles 102 from melting and fusing together as intended, e.g., to have an intended strength, rigidity, hardness, color, translucency, surface roughness, combinations thereof, or the like. However, when the size of the fusing area 104 is below the certain size, the rate at which thermal bleed occurs may result in the particles 102 in the fusing area 104 from failing to reach and/or remain at or above the melting point temperature for sufficient melting to occur such that the particles 102 fuse together as intended. The certain size may pertain to a thickness, a width, a length, an area, a volume, or combinations thereof, of the fusing area 104, which may extend across multiple layers of particles 102. The certain size may also be referenced herein as a predefined size.

The certain size may depend, for instance, upon the type of particle 102, the type of fusing agent 122, the type and/or strength of energy 132 emitted by the energy supply system 130, combinations thereof, and the like. In some examples, the certain size may be determined through testing of different combinations of particle 102 types, fusing agent 122 types, energy 132 types and/or strengths, etc. In addition or in other examples, the certain size may be the same for different combinations of particle 102 types, fusing agent 122 types, energy 132 types and/or strengths, etc. In any of these examples, the controller 110 may form the unfused thermal support area 106 adjacent to the fusing area 104 when the fusing area 104 is below the certain size and may not form the unfused thermal support area 106 when the fusing area 104 is at or above the certain size.

According to examples disclosed herein, the unfused thermal support area 106 may reduce the rate at which thermal bleed occurs from the particles 102 in the fusing area 104. In this regard, the unfused thermal support area 106 may facilitate the melting and fusing together of the particles 102 in the fusing area 104. In other words, because the particles 102 in the unfused thermal support area 106 are at a higher temperature than the particles 102 outside of the unfused thermal support area 106 and the fusing area 104, a thermal gradient between the particles 102 in the fusing area 104 and the particles 102 in the unfused thermal support area 106 may be smaller than a thermal gradient between the particles 102 in the fusing area 104 and the particles 102 outside of the unfused thermal support area 106. As such, the rate at which heat is transferred from the particles 102 in the fusing area 104 to the particles 102 in the unfused thermal support area 106 may be lower than the rate at which heat is transferred from the particles 102 in the fusing area 104 to the particles 102 outside of the unfused thermal support area 106. This may result in the particles 102 in the fusing area 104 to be at a higher temperature, which may reduce the effects of thermal bleed and the particles 102 may thus reach and/or remain at a sufficiently high temperature for the particles 102 to melt and fuse together as intended.

The unfused thermal support area 106 may have a similar shape to the fusing area 104 or may have a different shape from the fusing area 104. The unfused thermal support area 106 may extend at a same distance from the entire periphery of the fusing area 104 or may extend different distances at different locations around the fusing area 104. The distance or distances at which the unfused thermal support area 106 extends from the fusing area 104, e.g., the width or widths of the unfused thermal support area 106, may be based on the amount of temperature increase for the particles 102 in the fusing area 104 to fuse as intended. The width or widths at which the unfused thermal support area 106 may be determined based on testing, estimations of thermal bleed, correlations between fusing area 104 sizes and thermal bleed, etc. In addition, in various examples, the unfused thermal support area 106 may be formed to increase a local temperature around the unfused thermal support area 106 to, for instance, make the temperature distribution on a particle bed more uniform.

Figure 1B:
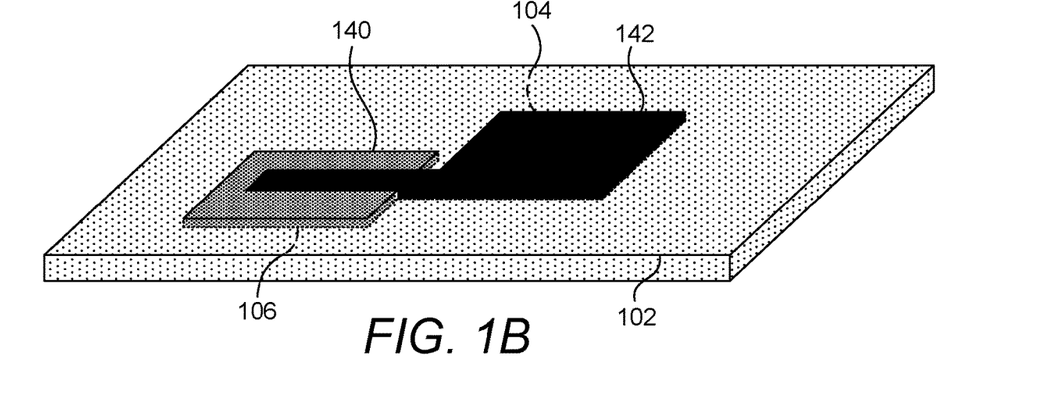
FIG. 1B shows an isometric view of a layer of particles on which a fusing area and an example unfused thermal support area have been formed.

According to examples, and as shown in FIG. 1A, the entire fusing area 104 may be below the certain size. In these examples, the unfused thermal support 106 may be formed around the entire periphery of the fusing area 104. In other examples, and as shown with respect to FIG. 1B, the fusing area 104 may have an irregular shape. That is, the fusing area 104 may include a first feature 140 that is below the certain size and a second feature 142 that is above the certain size. In these examples, a unfused thermal support area 106 may be formed adjacent to the first feature 140 without a unfused thermal support area 106 being formed adjacent to the second feature 142. In one regard, the unfused thermal support area 106 may selectively be formed to increase the temperature of the particles 102 in the areas of an object that are below the certain size. In addition, the unfused thermal support area 106 may not be adjacent to the second feature 142, e.g., immediately next to second feature 142, as the second feature 142 may reach and/or remain at a temperature above the melting point temperature of the particles 102 due to the sufficiently large size of the second feature 142. As such, thermal bleed of the particles 102 forming the second feature 142 may not be sufficient to prevent the particles 102 forming the second feature 142 from melting and fusing together as intended.

Figure 1C:
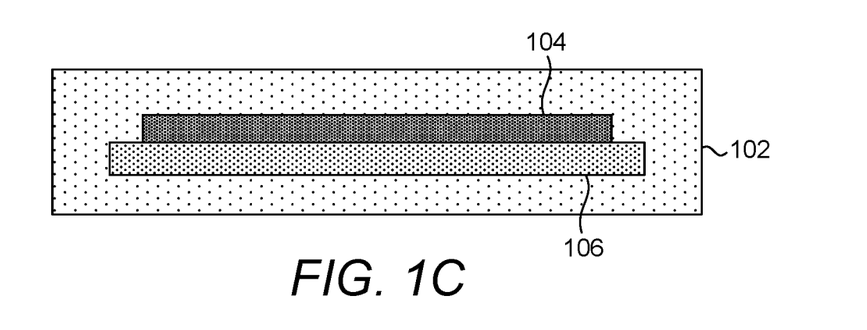
FIGS. 1C-1E, respectively, show cross-sectional side views of layers of particles on which a fusing area and an example unfused thermal support area have been formed.
Figure 1D:
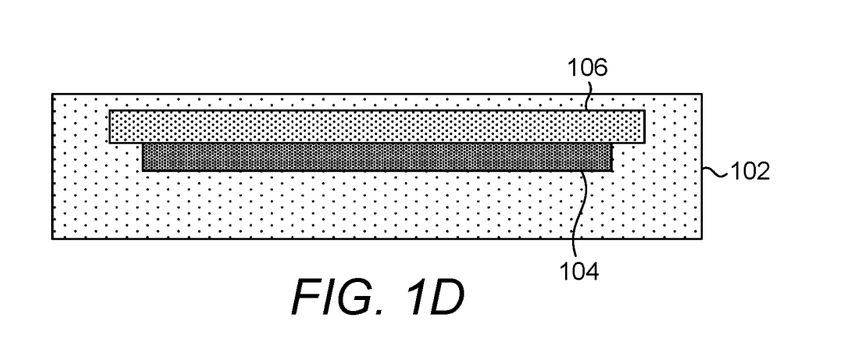
Figure 1E:
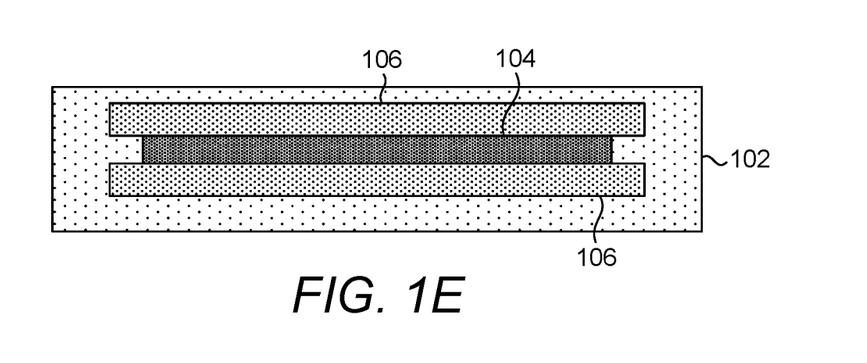

Turning now to FIGS. 1C-1E, there are respectively shown cross-sectional side views of layers of particles 102 on which a fusing area 104 and an example unfused thermal support area 106 have been formed. With reference first to FIG. 1C, the unfused thermal support area 106 may be formed beneath the fusing area 104. That is, for instance, the fusing area 104 may be formed directly on top of the particles 102 forming the unfused thermal support area 106. As shown in FIG. 1D, the unfused thermal support area 106 may be formed above the fusing area 104 and as shown in FIG. 1E, a first unfused thermal support area 106 may be formed beneath the fusing area 104 and a second unfused thermal support area 106 may be formed above the fusing area 104. In addition or in other examples, unfused support areas 106 may be formed in various combinations of locations with respect to the fusing area 104. It should thus be understood that FIGS. 1A-1E may indicate that the unfused thermal support area 106 may be formed on any side or on multiple sides adjacent to the fusing area 104. As used herein, the term "adjacent" with reference to an unfused thermal area 106 may refer to any side, including laterally, below or above, the fusing area 104.

Figure 2:
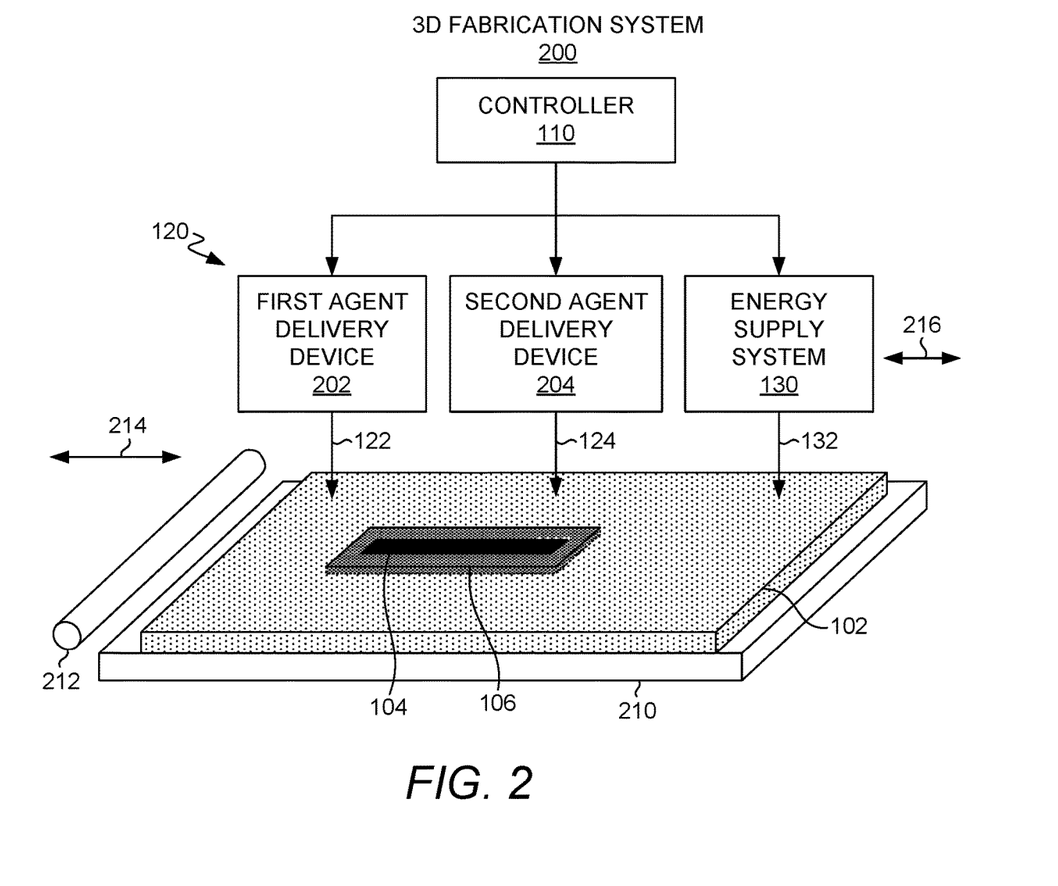
FIG. 2 shows a diagram of another example 3D fabrication system that may form an unfused thermal support area to reduce a rate at which particles forming a portion of a 3D object thermally bleeds.

Turning now to FIG. 2, there is shown a diagram of another example 3D fabrication system 200 that may form an unfused thermal support area to reduce a rate at which particles forming a portion of a 3D object thermally bleeds. The 3D fabrication system 200 may be similar to the 3D fabrication system 100 depicted in FIG. 1A and may include many of the same components. However, in the 3D fabrication system 200, the agent delivery system 120 is depicted as including multiple delivery devices 202, 204. That is, the agent delivery system 120 is depicted as including a first agent delivery device 202 that may deliver the fusing agent 122 and a second agent delivery device 204 that may deliver the energy absorbing agent 124. As noted above, the energy absorbing agent 124 may be the same as or may differ from the fusing agent 122.

Although not shown, the energy supply system 130 may also include a single energy supply device or multiple energy supply devices. In any regard, the energy supply system 130 may supply any of various types of energy. For instance, the energy supply system 130 may supply energy in the form of light (visible, infrared, or both), in the form of heat, in the form of electromagnetic energy, combinations thereof, or the like. According to examples, the type and/or amount of fusing agent 122 and energy absorbing agent 124 deposited onto the particles 102 may be tuned to the type and strength of the energy that the energy supply system 130 emits such that, for instance, the particles 102 may be heated as intended. By way of example, the tuning may be implemented to maximize the heating of the particles 102 while minimizing the amount of energy applied by the energy supply system 130.

The 3D fabrication system 200 may also include build platform 210, which may be in a build chamber within which 3D objects may be fabricated from the particles 102 provided in respective layers on the build platform 210. Particularly, the build platform 210 may be provided in a build chamber and may be moved downward as features of a 3D object are formed in successive layers of the particles 102. Although not shown, the particles 102 may be supplied between a recoater 212 and the build platform 210 and the recoater 212 may be moved in a direction represented by the arrow 214 across the build platform 210 to spread the particles 102 into a layer. In addition, the agent delivery system 120 and the energy supply system 130 may be moved across the build platform 210 as indicated by the arrow 216 to fuse together particles 102 in selected areas of layers of particles 102. For instance, the agent delivery system 120 and the energy supply system 130 may be supported on a carriage that is to move in the directions 216. In some examples, the recoater 212 may be provided on the same carriage. In other examples, the agent delivery system 120 and the energy supply system 130 may be supported on separate carriages such that the agent delivery system 120 and the energy supply system 130 may be moved separately with respect to each other. In any regard, following formation of a layer of particles 102 and a portion of a 3D object on the layer, the recoater 212 may be implemented to form another layer and this process may be repeated to fabricate the 3D object.

Although not shown, the 3D fabrication system 200 may include a heater to maintain an ambient temperature of the build envelope or chamber at a relatively high temperature. In addition or in other examples, the build platform 210 may be heated to heat the particles 102 to a relatively high temperature. The relatively high temperature may be a temperature near the melting temperature of the particles 102 such that a relatively low level of energy 132 may be applied to selectively fuse the particles 102.

Figure 3:
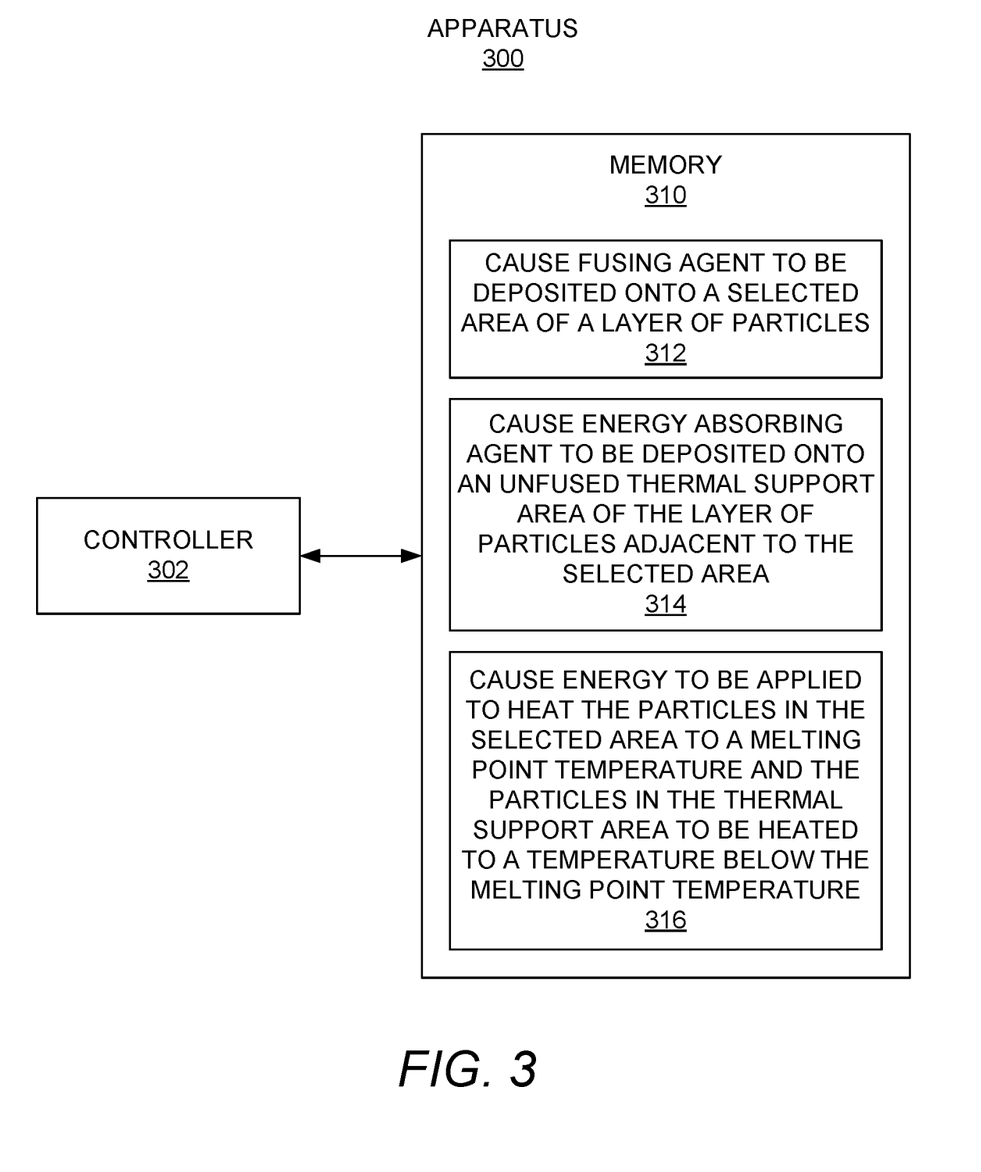
FIG. 3 shows a block diagram of an example apparatus that may cause an unfused thermal support area to be formed adjacent to a selected area during formation of a portion of a 3D object.

With reference now to FIG. 3, there is shown a block diagram of an example apparatus 300 that may cause an unfused thermal support area to be formed adjacent to a selected area during formation of a portion of a 3D object. It should be understood that the example apparatus 300 depicted in FIG. 3 may include additional features and that some of the features described herein may be removed and/or modified without departing from the scope of the apparatus 300. In addition, the features of the apparatus 300 are described with respect to the components of the 3D fabrication systems 100, 200 discussed above with respect to FIGS. 1A and 2.

Generally speaking, the apparatus 300 may be a computing device, a control device of a 3D fabrication system 100, 200, or the like. As shown in FIG. 3, the apparatus 300 may include a controller 302 that may control operations of the apparatus 300. The controller 302 may be equivalent to the controller 110 discussed above. The controller 302 may be a semiconductor-based microprocessor, a central processing unit (CPU), an application specific integrated circuit (ASIC), a field-programmable gate array (FPGA), and/or other suitable hardware device.

The apparatus 300 may also include a memory 310 that may have stored thereon machine readable instructions 312-316 (which may also be termed computer readable instructions) that the controller 302 may execute. The memory 310 may be an electronic, magnetic, optical, or other physical storage device that contains or stores executable instructions. The memory 310 may be, for example, Random Access memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The controller 302 may fetch, decode, and execute the instructions 312 to cause fusing agent 122 to be deposited onto a selected area, e.g., a fusing area 104, of a layer of particles 102 of build material. For instance, the controller 302 may control the agent delivery system 120 to deposit the fusing agent 122 onto the selected area of the layer of particles 102. The controller 302 may fetch, decode, and execute the instructions 314 to cause an energy absorbing agent 124 to be deposited onto an unfused thermal support area 106 of the layer of particles 102 that is adjacent to the selected area 104. For instance, the controller 302 may control the agent delivery system 120 to deposit the energy absorbing agent 124 onto the unfused thermal support area 106 of the layer of particles 102. The controller 302 may fetch, decode, and execute the instructions 316 to cause energy to be applied. For instance, the controller 302 may control the energy supply system 130 to supply energy 132 onto the layer of particles 102, the deposited fusing agent 122, and the deposited energy absorbing agent 124. As discussed herein, application of the energy 132 may cause the particles 102 on which the fusing agent 122 has been deposited to be heated to a temperature above a melting point temperature of the particles 102 and the particles 102 on which the energy absorbing agent 124 has been deposited to be heated to a higher temperature that is below the melting point temperature of the particles 102.

In other examples, instead of the memory 310, the apparatus 300 may include hardware logic blocks that may perform functions similar to the instructions 312-316. In yet other examples, the apparats 300 may include a combination of instructions and hardware logic blocks to implement or execute functions corresponding to the instructions 312-316. In any of these examples, the controller 302 may implement the hardware logic blocks and/or execute the instructions 312-316.

Figure 4:
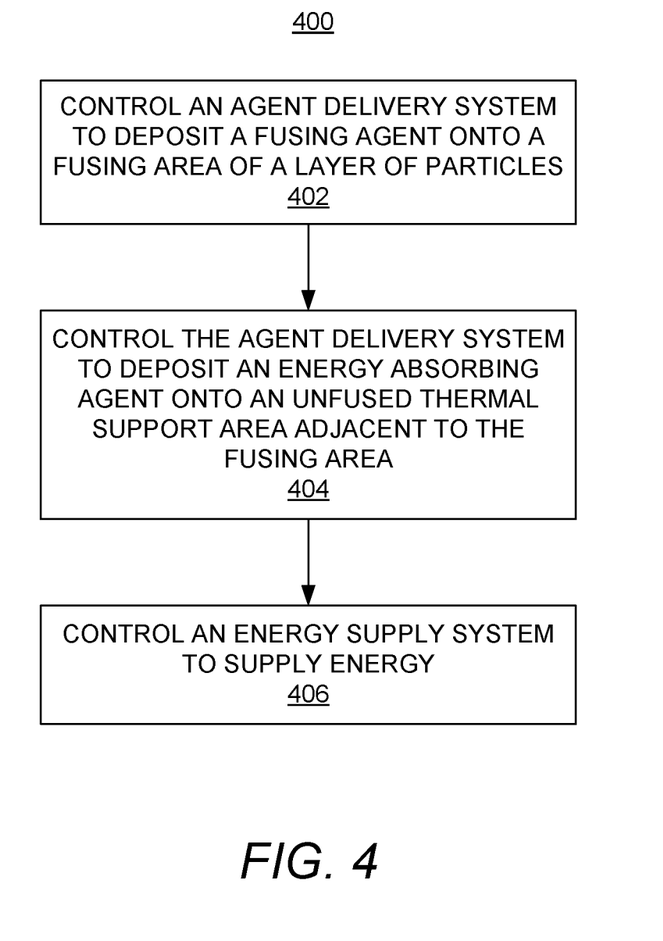
FIG. 4 shows a flow diagram of an example method for forming an unfused thermal support area.

Various manners in which the controller 110, 302 may operate are discussed in greater detail with respect to the method 400 depicted in FIG. 4. Particularly, FIG. 4 depicts a flow diagram of an example method 400 for forming an unfused thermal support area 106. It should be understood that the method 400 depicted in FIG. 4 may include additional operations and that some of the operations described therein may be removed and/or modified without departing from scope of the method 400. The description of the method 400 is made with reference to the features depicted in FIGS. 1A-3 for purposes of illustration.

At block 402, the controller 110, 302 may control an agent delivery system 120 to deposit a fusing agent 122 onto a fusing area 104 of a layer of particles 102 of build material corresponding to an object being fabricated.

At block 404, the controller 110, 302 may control the agent delivery system 120 to deposit an energy absorbing agent 124 onto an unfused thermal support area 106 of the layer of particles 102.

At block 406, the controller 110, 302 may control an energy supply system 130 to supply energy 132 onto the layer of particles 102, including the deposited fusing agent 122 and the deposited energy absorbing agent 124. As discussed herein, application of the energy 134 may cause the particles 102 on which the fusing agent 122 has been deposited to be heated to a temperature above a melting point temperature of the particles 102 and the particles 102 on which the energy absorbing agent 124 has been deposited to be heated to a higher temperature that is below the melting point temperature of the particles 102. As also discussed herein, by increasing the temperature of the particles 102 in an area adjacent to the fusing area 104, the rate at which thermal bleed occurs among the particles 102 in the fusing area 104 may be reduced. This may also result in the particles 102 in the fusing area 104 reaching and remaining at a temperature above a melting point temperature of the particles 102 to cause the particles 102 to melt and properly fuse together.

According to examples, at block 404, the controller 110, 302 may control the agent delivery system 120 to deposit the energy absorbing agent 124 at a sufficiently low contone level to cause the particles 102 on which the energy absorbing agent 124 is deposited to remain unfused responsive to receipt of energy from the energy supply system 130. In addition or in other examples, the controller 110, 302 may control the agent delivery system 120 to deposit a mixture of the energy absorbing agent 124 and a cooling agent and/or a defusing agent to cause the particles 102 on which the energy absorbing agent 124 is deposited to remain unfused responsive to receipt of energy from the energy supply system 130.

In other examples, the controller 110, 302 may determine whether the fusing area 104 corresponds to a portion of the object to be fabricated that has a size below a predefined size. In these examples, the controller 110, 302 may control the agent delivery system 120 to deposit the energy absorbing agent 124 in the unfused thermal support area 106 based on the size of the fusing area 104 falling below the predefined size. In addition, the controller 110, 302 may not control the agent delivery system 120 to deposit the energy absorbing agent 124 in an unfused thermal support area 106 based on the size of the fusing area 104 meeting or exceeding the predefined size. In other words, the controller 110, 302 may control the agent delivery system 120 to form an unfused thermal support area 106 based on a determination that the particles 102 in the fusing area 104 may not reach the melting point temperature without the unfused thermal support area 106.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
controlling an agent delivery system to deposit a fusing agent onto a fusing area of a layer of particles of build material corresponding to an object being fabricated;
determining a predefined size based on a type of the particles, a type of the fusing agent, and a type of energy to be emitted by an energy supply system;
determining that the fusing area corresponds to a portion of the object to be fabricated, the portion having a size below the predefined size;
identifying an unfused thermal support area to be formed adjacent to the fusing area based on the determination that the fusing area corresponds to the portion having a size below the predefined size;
controlling the agent delivery system to deposit an energy absorbing agent onto the unfused thermal support area adjacent to the fusing area;
controlling the energy supply system to supply energy, wherein supply of the energy causes the particles on which the fusing agent has been deposited to be heated to a temperature above a melting point temperature of the particles and the particles on which the energy absorbing agent has been deposited to be heated to a temperature below the melting point temperature of the particles, wherein the unfused thermal support area is to reduce a thermal bleed rate of the heated particles in the fusing area.

2. The method of claim 1, wherein controlling the agent delivery system to deposit the energy absorbing agent further comprises controlling the agent delivery system to deposit the energy absorbing agent to cause the particles on which the energy absorbing agent is deposited to remain unfused responsive to receipt of the supplied energy.

3. The method of claim 1, further comprising:
determining that the object comprises a second portion having a size that is larger than the predefined size; and
controlling the agent delivery system to deposit the fusing agent onto a second area of the layer of particles corresponding to the second portion of the object without depositing the energy absorbing agent adjacent to the second area.

4. The method of claim 1, wherein controlling the agent delivery system to deposit the energy absorbing agent further comprises controlling the agent delivery system to deposit the energy absorbing agent at a lower density level than a density level at which the fusing agent is deposited.

5. A method comprising:
controlling an agent delivery system to deposit a fusing agent onto a fusing area of a layer of particles of build material corresponding to an object being fabricated;
determining a predefined size based on a type of the particles, a type of the fusing agent, and a type of energy to be emitted by an energy supply system;
determining that the fusing area corresponds to a portion of the object to be fabricated, the portion having a size below the predefined size;
identifying an unfused thermal support area to be formed adjacent to the fusing area based on the determination that the fusing area corresponds to the portion having a size below the predefined size;
controlling the agent delivery system to deposit an energy absorbing agent onto the unfused thermal support area adjacent to the fusing area, wherein the energy absorbing agent comprises a different agent than the fusing agent, wherein the energy absorbing agent is a degradable agent that is to evaporate or disintegrate within a predetermined time period following receipt of energy; and
controlling the energy supply system to supply energy, wherein supply of the energy causes the particles on which the fusing agent has been deposited to be heated to a temperature above a melting point temperature of the particles and the particles on which the energy absorbing agent has been deposited to be heated to a temperature below the melting point temperature of the particles, wherein the unfused thermal support area is to reduce a thermal bleed rate of the heated particles in the fusing area.

6. The method of claim 5, wherein controlling the agent delivery system to deposit the energy absorbing agent further comprises controlling the agent delivery system to deposit the energy absorbing agent to cause the particles on which the energy absorbing agent is deposited to remain unfused responsive to receipt of the supplied energy.

7. The method of claim 5, further comprising:
determining that the object comprises a second portion having a size that is larger than the predefined size; and
controlling the agent delivery system to deposit the fusing agent onto a second area of the layer of particles corresponding to the second portion of the object without depositing the energy absorbing agent adjacent to the second area.

8. The method of claim 5, wherein controlling the agent delivery system to deposit the energy absorbing agent further comprises controlling the agent delivery system to deposit the energy absorbing agent at a lower density level than a density level at which the fusing agent is deposited.

9. A method comprising:
controlling an agent delivery system to deposit a fusing agent onto a fusing area of a layer of particles of build material corresponding to an object being fabricated;
determining a predefined size based on a type of the particles, a type of the fusing agent, and a type of energy to be emitted by an energy supply system;
determining that a size of the fusing area is smaller than the predefined size;
based on the determination that the size of the fusing area is smaller than the predefined size, determining that a thermal support is to be fabricated;
forming the thermal support by controlling the agent delivery system to deposit an energy absorbing agent onto an unfused area of the layer of particles, the unfused area being located adjacent to the fusing area; and
controlling the energy supply system to supply energy, wherein supply of the energy causes the particles on which the fusing agent has been deposited to be heated to a temperature above a melting point temperature of the particles and the particles on which the energy absorbing agent has been deposited to be heated to a temperature below the melting point temperature of the particles, wherein the unfused thermal support area is to reduce a thermal bleed rate of the heated particles in the fusing area.

10. The method of claim 9, wherein controlling the agent delivery system to deposit the energy absorbing agent further comprises controlling the agent delivery system to deposit the energy absorbing agent to cause the particles on which the energy absorbing agent is deposited to remain unfused responsive to receipt of the supplied energy.

11. The method of claim 10, further comprising:
determining that the object comprises a second portion having a size that is larger than the predefined size; and
controlling the agent delivery system to deposit the fusing agent onto a second area of the layer of particles corresponding to the second portion of the object without depositing the energy absorbing agent adjacent to the second area.

12. The method of claim 9, wherein controlling the agent delivery system to deposit the energy absorbing agent further comprises controlling the agent delivery system to deposit the energy absorbing agent at a lower density level than a density level at which the fusing agent is deposited.

* * * * *